United States Patent
Price et al.

(10) Patent No.: US 11,374,343 B2
(45) Date of Patent: Jun. 28, 2022

(54) METHOD OF PREVENTING MOISTURE INTRUSION THROUGH THE CABLE EXIT OF AN ENCLOSURE COMPRISING TERMINALS

(71) Applicant: HYDRA-ELECTRIC COMPANY, Burbank, CA (US)

(72) Inventors: Daniel Scott Price, Simi Valley, CA (US); Robert Andrew Guziak, Thousand Oaks, CA (US); David Eugene Schmidt, Canyon Country, CA (US)

(73) Assignee: HYDRA-ELECTRIC COMPANY, Burbank, CA (US)

( * ) Notice: Subject to any disclaimer, the term of this patent is extended or adjusted under 35 U.S.C. 154(b) by 0 days.

(21) Appl. No.: 17/059,596

(22) PCT Filed: May 31, 2019

(86) PCT No.: PCT/US2019/034909
§ 371 (c)(1),
(2) Date: Nov. 30, 2020

(87) PCT Pub. No.: WO2019/232377
PCT Pub. Date: Dec. 5, 2019

(65) Prior Publication Data
US 2021/0265759 A1     Aug. 26, 2021

Related U.S. Application Data

(60) Provisional application No. 62/678,609, filed on May 31, 2018.

(51) Int. Cl.
*H01R 13/52*     (2006.01)
*H01R 43/00*     (2006.01)
(Continued)

(52) U.S. Cl.
CPC ....... *H01R 13/405* (2013.01); *H01R 13/5045* (2013.01); *H01R 13/5205* (2013.01); *H01R 13/5216* (2013.01); *H01R 43/005* (2013.01)

(58) Field of Classification Search
CPC .............. H01R 13/405; H01R 13/5045; H01R 13/5205; H01R 13/5216; H01R 43/005
See application file for complete search history.

(56) References Cited

U.S. PATENT DOCUMENTS 2,827,509 A    3/1958 Wayman
4,015,329 A *  4/1977 Hutchison .............. H02G 3/088
                                                            29/858

(Continued)

FOREIGN PATENT DOCUMENTS

CN        206116746 U    4/2017

OTHER PUBLICATIONS

International Search Report and Written Opinion for PCT/US19/34909, dated Aug. 8, 2019.

*Primary Examiner* — Vanessa Girardi
(74) *Attorney, Agent, or Firm* — Concept IP LLP; Michael Zarrabian

(57) ABSTRACT

Systems, devices, and methods including: a cable; a housing having a tapered exit hole connected to an internal volume; a tapered seal having a tapered outer surface and an inner aperture, where the inner aperture of the tapered seal receives the cable; an encapsulant disposed in the internal volume and about one or more wires of the cable; and a compression cap placed over the tapered seal and about a flange of the housing to compress the tapered seal into the tapered exit hole; where compression from the compression cap forces the encapsulant up inside the cable and around the one or more wires of the cable, and where curing of the encapsulant seals the cable from moisture incursion.

20 Claims, 7 Drawing Sheets

(51) Int. Cl.
*H01R 13/405* (2006.01)
*H01R 13/504* (2006.01)

(56) References Cited

U.S. PATENT DOCUMENTS

| | | | | |
|---|---|---|---|---|
| 5,589,666 A | * | 12/1996 | DeCarlo | H02G 15/013 |
| | | | | 174/76 |
| 5,920,035 A | * | 7/1999 | Haney | B01D 65/02 |
| | | | | 174/152 G |
| 2004/0023554 A1 | | 2/2004 | Khemakem et al. | |
| 2010/0140877 A1 | | 6/2010 | Pratley | |

\* cited by examiner

METHOD OF PREVENTING MOISTURE INTRUSION THROUGH THE CABLE EXIT OF AN ENCLOSURE COMPRISING TERMINALS

CROSS-REFERENCE TO RELATED APPLICATION

This application is a 35 U.S.C § 371 National Stage Entry of International Application No. PCT/US2019/034909 filed May 31, 2019, which claims the priority benefit of U.S. Provisional Patent Application Ser. No. 62/678,609 filed May 31, 2018, all of which are incorporated herein by reference in their entirety for all purposes.

FIELD OF ENDEAVOR

The invention relates to moisture sealing, and more particularly to sealing cables.

BACKGROUND

Cables may require sealing at an entry point into a device such as a sensor or a switch. In certain applications, such as aircraft, variations in temperature, humidity, and pressure all change in a way that causes moisture to be pulled into a device. In the cold high altitudes, moisture in the device turns into ice, which expands and may cause physical damage that aggregates the problem. Insulation resistance (IR) for traditional cable sealing breaks down at less than 100 cycles.

SUMMARY

In one system embodiment, a moisture, ice, liquid or gas sealing system embodiment may include: a cable having an insulation and one or more wires disposed in the insulation; a housing having a tapered exit hole connected to an internal volume, where the one or more wires of the cable may be connected to one or more terminals disposed in the internal volume; a tapered seal having a tapered outer surface and an inner aperture, where the inner aperture of the tapered seal may receive the cable; an encapsulant disposed in the internal volume and about the one or more wires of the cable connected to the one or more terminals; and a compression cap placed over the tapered seal to compress the tapered seal into the tapered exit hole; where compression from the compression cap may force the encapsulant up inside the cable and around the one or more wires of the cable, and where curing of the encapsulant may seal the cable from moisture ingress.

In additional system embodiments, the cable insulation may be an external cable insulation. The housing may include an upper housing, where the upper housing may include the tapered exit hole and the internal volume. A first side of the tapered exit hole may have a greater diameter than a second side of the tapered exit hole. The tapered exit hole may be connected to the internal volume proximate the second side of the tapered exit hole. The tapered exit hole may be at least partially disposed in a flange of the upper housing. The housing may further include a lower housing, where the lower housing may include the one or more terminals. A first side of the tapered seal may have a greater diameter than a second side of the tapered seal, and the tapered seal may be disposed in the tapered exit hole such that the first side of the tapered seal is proximate the first side of the tapered exit hole and the second side of the tapered seal is proximate the second side of the tapered exit hole. The inner aperture of the tapered seal may include at least one stop to prevent the cable insulation from exiting the second side of the tapered seal. The encapsulant may be a low viscosity encapsulant, such as silicone elastomers. The compression cap may include an aperture, and the aperture of the compression cap may receive the cable. The compression cap may be placed over the tapered seal to compress the tapered seal into the tapered exit hole forming a first seal between the tapered outer surface of the tapered seal and the tapered exit hole and forming a second seal between the inner aperture of the tapered seal and the external cable insulation of the cable, where the encapsulant may be forced up inside the cable and around the one or more wires of the cable to extrude past the tapered exit hole to provide a secure mechanical resisting force to pulling on the cable.

A moisture, ice, liquid or gas sealing method embodiment may include: inserting a cable into an inner aperture of a tapered seal comprising a tapered outer surface; connecting one or more wires of the cable to one or more terminals of a housing; filling the internal volume with an encapsulant, where the encapsulant surrounds the one or more wires of the cable connected to the one or more terminals; inserting the tapered seal into a tapered exit hole in the housing, where the tapered exit hole is connected to the internal volume; and placing a compression cap over the tapered seal to compress the tapered seal into the tapered exit hole; where compression from the compression cap forces the encapsulant up inside the cable and around the one or more wires of the cable, and where curing of the encapsulant seals the cable from moisture incursion.

Additional method embodiments may include: placing the cable having an external cable insulation through an aperture of the compression cap, where the one or more wires are disposed in the external cable insulation. The housing may further include an upper housing and a lower housing. The lower housing may be attached to the upper housing, where the upper housing may include the tapered exit hole connected to the internal volume, and where the one or more terminals may be disposed in the internal volume. The encapsulant may be a low viscosity encapsulant. Placing the compression cap over the tapered seal may further include: forming a first seal between an outside diameter of the tapered seal and the tapered exit hole, and forming a second seal between the inner aperture of the tapered seal and the external cable insulation of the cable. The cable may be prevented from exiting the tapered seal via at least one stop.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
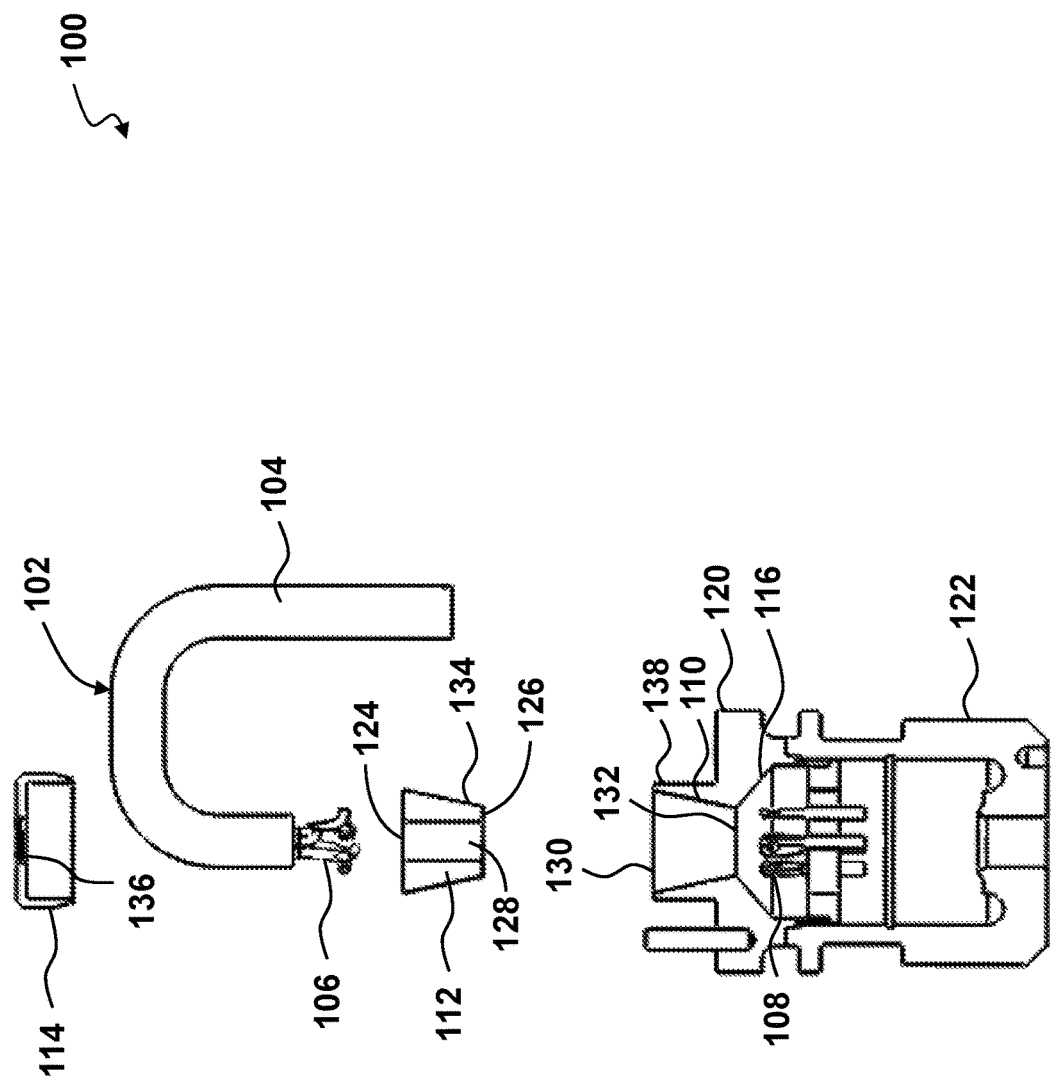
FIG. 1 depicts a partial cutaway exploded view of a system for sealing a cable at an entry point.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The moisture, ice, liquid and/or gas sealing system and method disclosed herein allow for active cable sealing at an entry point into a device such that moisture incursion is prevented and the seal maintains insulation resistance (IR) in excess of 200 icing cycles. The cable may have an outer insulation layer and one or more wires disposed within the outer insulation layer. The one or more wires may be connected to one or more terminals disposed in an internal volume of a housing. The internal volume may then be filled with an encapsulant. In some embodiments, a solid elastomer with passage for the wires may be compressed within the tapered cavity. A second sealant below the solid elastomer may be pumped by the action of compression into the wire strands and insulation to prevent capillary action transport of moisture through the wires. This compression may also seals any imperfection in the elastomer to tapered housing. A tapered hole in the housing connects to the internal volume and is sized to receive a tapered seal disposed about the cable. A compression cap is placed over the tapered seal to compress the tapered seal into the tapered exit hole.

The tapered exit hole provides an advantage as the force of assembly generates a seal with the advantage of a positive force in the direction of compression when using a solid elastomer. The tapered exit hole allows for a significant extrusion of encapsulant as it is pumped into the wires, with the elastomer compressing the wires, and the encapsulant extruding past the end of the taper and providing strength giving pull strength to the cable containing the wires. The encapsulant, or potting material, may travel up the wire this within the cavity, and/or the encapsulant may extend past the cavity and into the upper compressing tapered seal. The amount of encapsulant used is based on the wire, the wire gage, and/or the insulation. The amount of encapsulant used provides a sufficient displacement distance to prevent moisture from entering the cavity. In some embodiments, the encapsulant may be displaced up to the point where the wire is compressed within the elastomeric tapered seal. The compression from the compression cap also forces encapsulant from the internal volume up inside the cable and around the one or more wires of the cable. Once the encapsulant is cured, the cable is sealed to the housing. In some embodiments, the seal may be a solid elastomer such as a rubber stopper. In other embodiments, the seal may be an injection molded and/or cured material. The seal may be forced into the tapered exit hole, or housing tube, and compress against the taper. At the bottom end, the elastomer may extrudes past the taper and fill the cavity beyond. This extrusion aids in the seal and provides a significant resistance to being pulled out by force on the cable. The encapsulant forced up inside the cable and around the one or more wires of the cable may extrude past the tapered exit hole, and outside of the housing, to provide a secure mechanical resisting force to pulling on the cable. This resisting force may prevent the cable from being detached from the housing, allowing water to enter into gaps created from pulling on the cable, or the like.

There are four paths for moisture to enter the housing: cracks in the potting, delamination of the potting opening a path, pressure differences driving water or vapor through a cable cover, and pressure differences driving water through individual wire insulation. The system and method disclosed herein prevent and/or minimize all four paths to prevent water ingress and maintain IR in a small form-factor. In some embodiments, sealing may also include: minimizing ingress points, maximizing electrical surface-to-surface distance, and/or using protective potting.

The system and method disclosed herein seal a cable and it's pass-through opening from moisture incursion and icing as would be seen in an application such as an aircraft or environmentally exposed devices where pressure, temperature, and relative humidity conditions may cycle from extreme to extreme, resulting in damage or failure due to the ingress of moisture. In some applications, failure can be caused by dielectric breakdown, insulation breakdown, and/or physical damage from the expansion of ice or corrosion due to moisture. Devices where this condition may exist include pressure sensors, temperature sensors, pressure switches, opto-isolators, unprotected environmental controls such as lighting, heating, sprinkler, cameras, radar, ultrasound area sensor, marine equipment, and the like.

The system and method disclosed herein use a rubber-like material to seal around the outside of the cable. The hole in which the cable exits the housing may be tapered, with a larger side of the opening furthest from the housing. A tapered rubber-like seal may pass over the cable and seat in the taper of the exit hole. This seal may then be compressed into the tapered hole, resulting in a radially inward force on the cable outer diameter. In some embodiments, prior to compressing the seal into place, a low viscosity encapsulant material may be used to fill the volume around the cable solder joints. When the rubber-like seal is inserted and compressed into the tapered hole, the encapsulant may be forced up inside the cable and around the individual lead wires. When cured, this low viscosity encapsulant material may seal the cable, preventing moisture intrusion from between, and through, the lead wires. A multi-conductor cable, with inner braided shield and external cable insulation, may be inserted into a steel body of a sensor using the disclosed system and method while resisting the effects of cycling through high and low temperature, pressure, vacuum, high atmospheric moisture content, and low humidity, such as found in aircraft applications.

The system disclosed herein provides an active seal as compared to a passive seal as may be found in potted assemblies. This active sealing system seals against the ingress of moisture, which is the cause of dielectric test failure, under varied conditions and through multiple pathways for moisture ingress. The system minimizes or eliminates failure modes allowing moisture ingresses such as material delamination, cracking, diffusion, capillary action, direct flow, and thermal pumping. This active seal is achieved by compressing a rubber-like tapered seal around the cable. The compression of the seal allows the seal to maintain its sealing ability during thermal expansion and contraction of surrounding materials.

FIG. 1 depicts a partial cutaway exploded view of a system 100 for sealing a cable 102 at an entry point. The cable 102 may include an external cable insulation 104 and one or more wires 106 disposed within the external cable insulation 104. The one or more wires 106 may be connected to one or more terminals 108. A lower housing 122 may include the one or more terminals 108. The lower housing 122 may be joined to an upper housing 120. The lower housing 122 may be any enclosure attached to the upper housing 120. In some embodiments, the lower housing 122 and the upper housing 122 may be any number of housings, such as one, two, or three or more. The terminals 108 may be connected to a wall of the housing, a structure on a printed circuit board (PCB), on a subassembly, a part on an independent internal structure, or the like.

The upper housing 120 of the system 100 may include a tapered exit hole 110 and an internal volume 116. A first side 130 of the tapered exit hole 110 may have a greater diameter than a second side 132 of the tapered exit hole 110. The tapered exit hole 110 may be connected to the internal volume 116 proximate the second side 132 of the tapered exit hole and the lower housing 122. In some embodiments, the tapered exit hole 110 may be at least partially disposed in a flange 138 of the upper housing 120.

A tapered seal 112 may include a tapered outer surface 134. A first side 124 of the tapered seal 112 may have a greater diameter than a second side 126 of the tapered seal 112. The first side 124 of the tapered seal 112 may be opposite the second side 126 of the tapered seal 112. The tapered seal 112 may also have an inner aperture 128. The inner aperture 128 of the tapered seal 112 may be sized to receive the cable 102. In some embodiments, the outer diameter of the inner aperture 128 of the tapered seal may be substantially equal to the outer diameter of the external cable insulation 104. The tapered seal 112 may be disposed in the tapered exit hole 110 such that the first side 124 of the tapered seal 112 is proximate the first side 130 of the tapered exit hole 110 and the second side 126 of the tapered seal 112 is proximate the second side 132 of the tapered exit hole 110. In some embodiments, the angle of the sides in the tapered seal 112 may be substantially equal to the angle of the sides in the tapered exit hole 110. The tapered seal 112 is used to seal the outer diameter of the cable 102. Once the tapered seal 112 is slipped over the cable 102 and seated inside the tapered hole 110, it is compressed to form a tight seal. In some embodiments, the size of the tapered seal 112 may be larger than the size of the tapered exit hole 110 so as to allow for compression of the tapered seal 112 in the tapered exit hole 110. In other embodiments, the size of the tapered seal 112 may be substantially equal to the size of the tapered exit hole 110.

A compression cap 114 may include an aperture 136 for receiving the cable 102. The compression cap 114 may be sized to fit over the flange 138 of the upper housing 120 to secure the tapered seal 112 in the tapered exit hole 110. The compression cap 114 may have a hollow end facing the upper housing 120 in some embodiments. The hollow end of the compression cap 114 may fit about the flange 138 and over the tapered seal 112 when the tapered seal 112 is inserted into the tapered exit hole 110. In some embodiments, the aperture 136 of the compression cap 114 may have an outer diameter substantially equal to the outer diameter of the inner aperture 128 of the compression cap 112 and/or the outer diameter of the external cable insulation 104.

Figure 2:
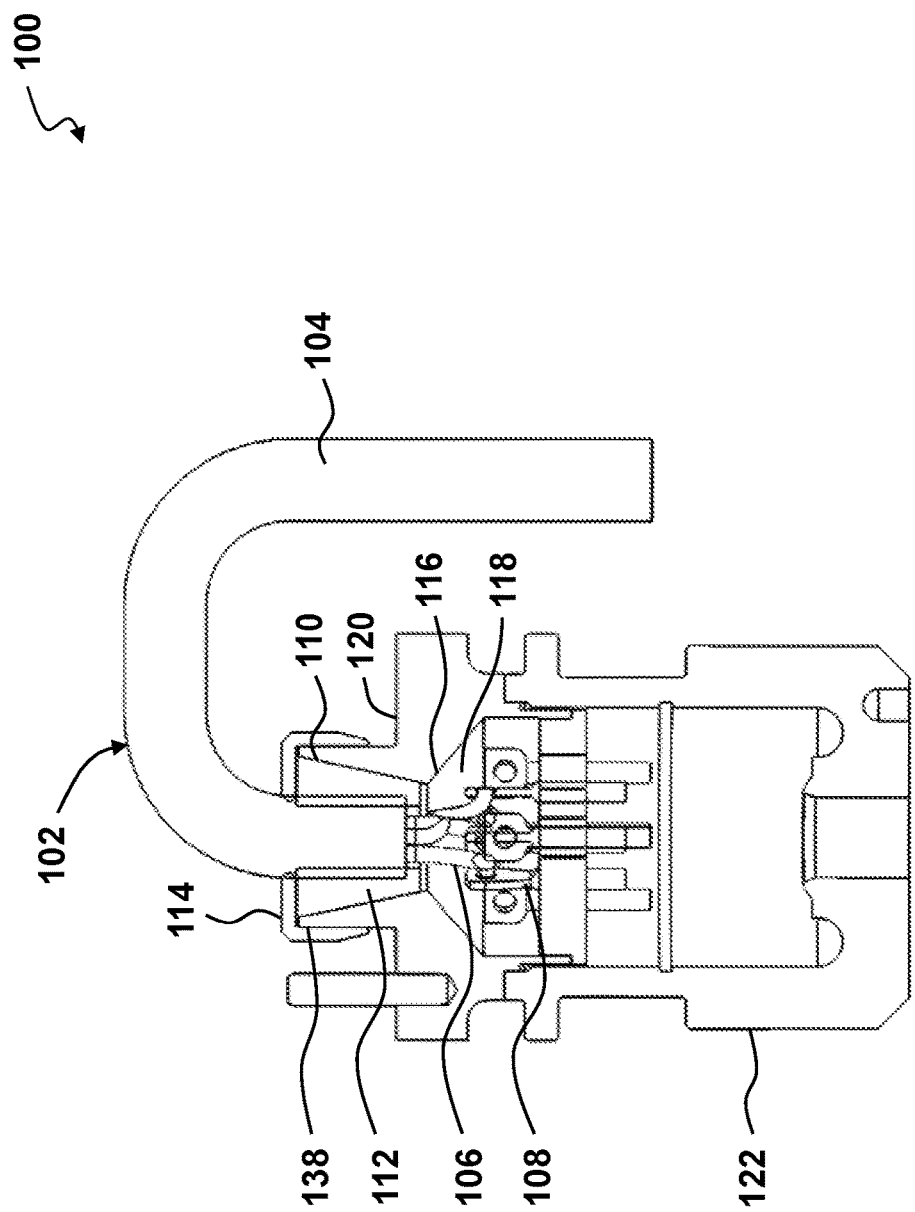
FIG. 2 depicts a partial cutaway assembled view of the system of FIG. 1.

FIG. 2 depicts a partial cutaway assembled view of the system 100 of FIG. 1. The external cable insulation 104 of the cable 102 is inserted through the compression cap 114 and the tapered seal 112. The wires 106 of the cable 102 are connected to respective terminals 108 disposed in the housing 120, 122. The upper housing 120 and lower housing 122 are joined together. The upper housing 120 and the lower housing 122 may be joined via a hermetic weld or other hermetic sealing methods, such as a hermetic epoxy seal. In some embodiments, the upper housing 120 and the lower housing 122 may be a single part, two parts, or two or more parts. The housing 120, 122 may be two or more parts to allow for access to the terminals 108 and/or to connect the wires 106 of the cable 102 to their respective terminals 108 while minimizing any openings in the housing 120, 122.

An encapsulant 118, such as a low viscosity encapsulant, is disposed in the internal volume 116. The encapsulant 118 may cover the connection between the wires 106 and the terminals 108. The tapered seal 112 may be placed in the tapered exit hole 110. The compression cap 114 is placed over the tapered seal 112 and about the flange 138 of the upper housing 120 to compress the tapered seal 112 into the tapered exit hole 110. As the compression cap 114 compresses the tapered seal 112 in the tapered exit hole 110, some encapsulant 118 in the internal volume 116 may be displaced from the internal volume 116 and into the tapered exit hole 110 and about the space between the wires 106 inside the external cable insulation 104. The size and/or shape of the internal volume; size and/or shape of the tapered exit hole 110; size and/or shape of the tapered seal 112; size and/or shape of the compression cap; and/or amount of encapsulant 118 poured into the internal volume 116 may be such as to allow for this intended displacement of the encapsulant 118 into the space between the wires 106 inside the external cable insulation. The tapered exit hole 110 in the housing 120 may be used to form the seal around the external cable insulation 104 of the cable 102 when it is compressed by the compression cap 114.

Figure 3:
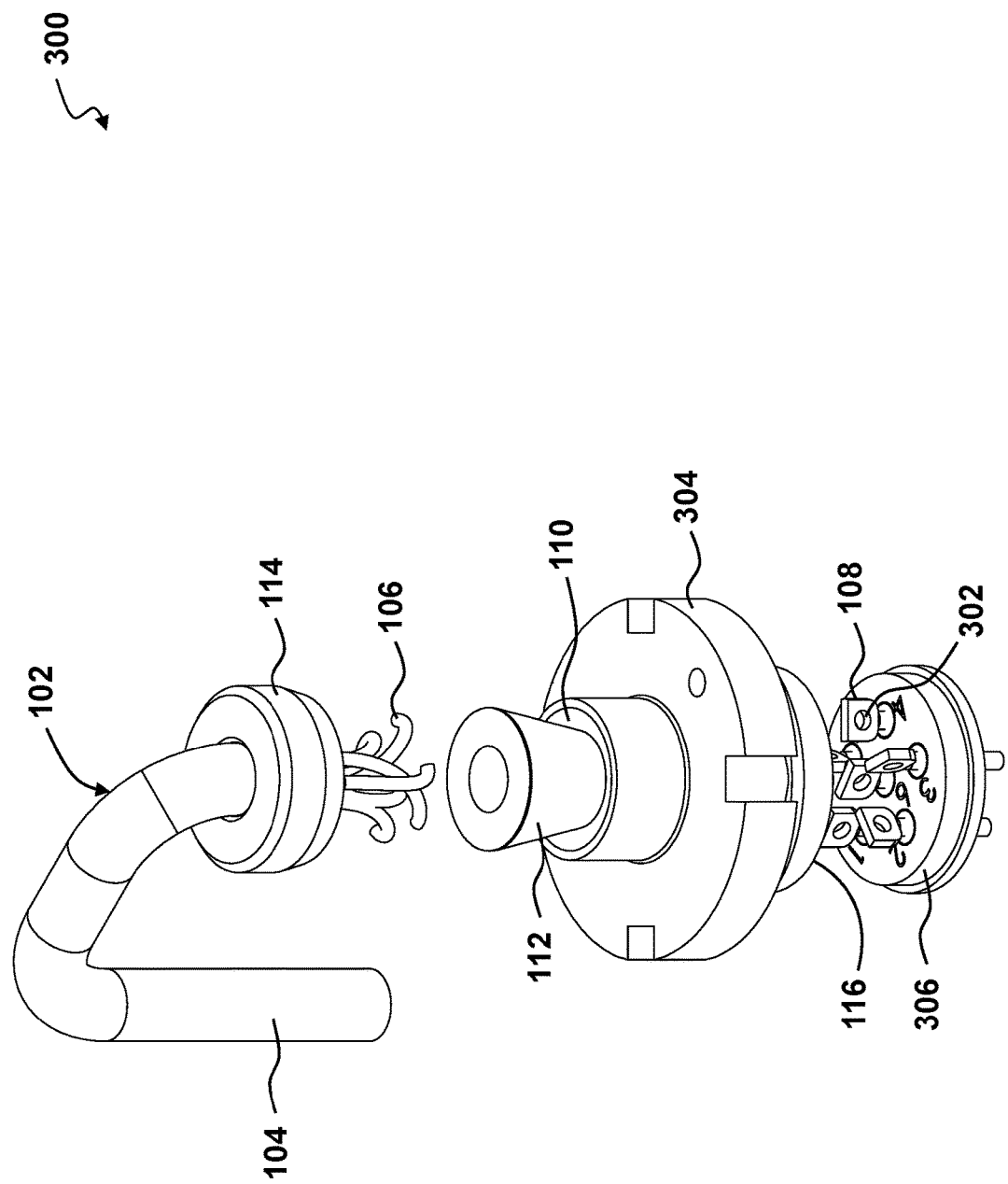
FIG. 3 depicts a perspective exploded view of another system for sealing a cable at an entry point.

FIG. 3 depicts a perspective exploded view of another system 300 for sealing a cable 102 at an entry point. The terminals 108 may each include an aperture 302 for threading a wire 106 of the cable 102 through and connecting the wire 106 to the terminal 108, such as via soldering. In other embodiments, the wires 106 may be connected to their respective terminals 108 via one or more eyelets, one or more crimping connectors, one or more heat shrink connectors, one or more screw connectors, one or more push-in connectors, or the like. An upper housing 304 may be fixedly attached or detachably attached to the lower housing 306. In some embodiments, an encapsulant in the internal volume 116 may seal the upper housing 304 to the lower housing 306 once the encapsulant cures.

Figure 4:
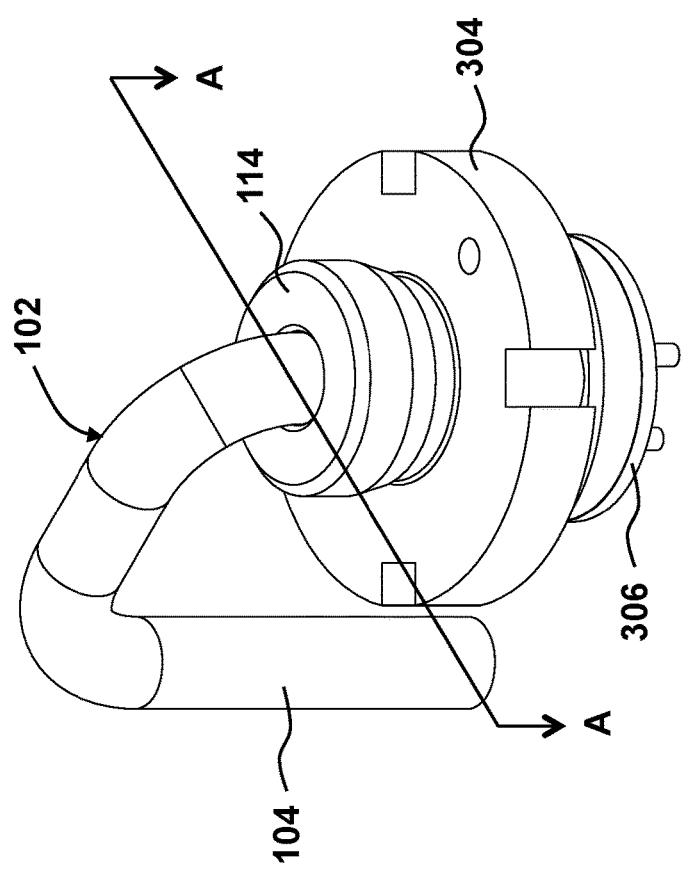
FIG. 4 depicts a perspective assembled view of the system of FIG. 3.

FIG. 4 depicts a perspective assembled view of the system 300 of FIG. 3. The upper housing 304 is joined to the lower housing 306. The compression cap 114 secures the tapered seal in the tapered exit hole. As the tapered seal is compressed into the tapered exit hole, encapsulant from the internal volume is displaced into the cable 102 inside the external cable insulation 104. Once the encapsulant cures, the system 300 prevents moisture intrusion even during extreme weather cycles, such as icing, and keeps the cable 102 from being pulled out from the upper housing 302. The encapsulant seals the inside diameter of the cable 102.

Figure 5:
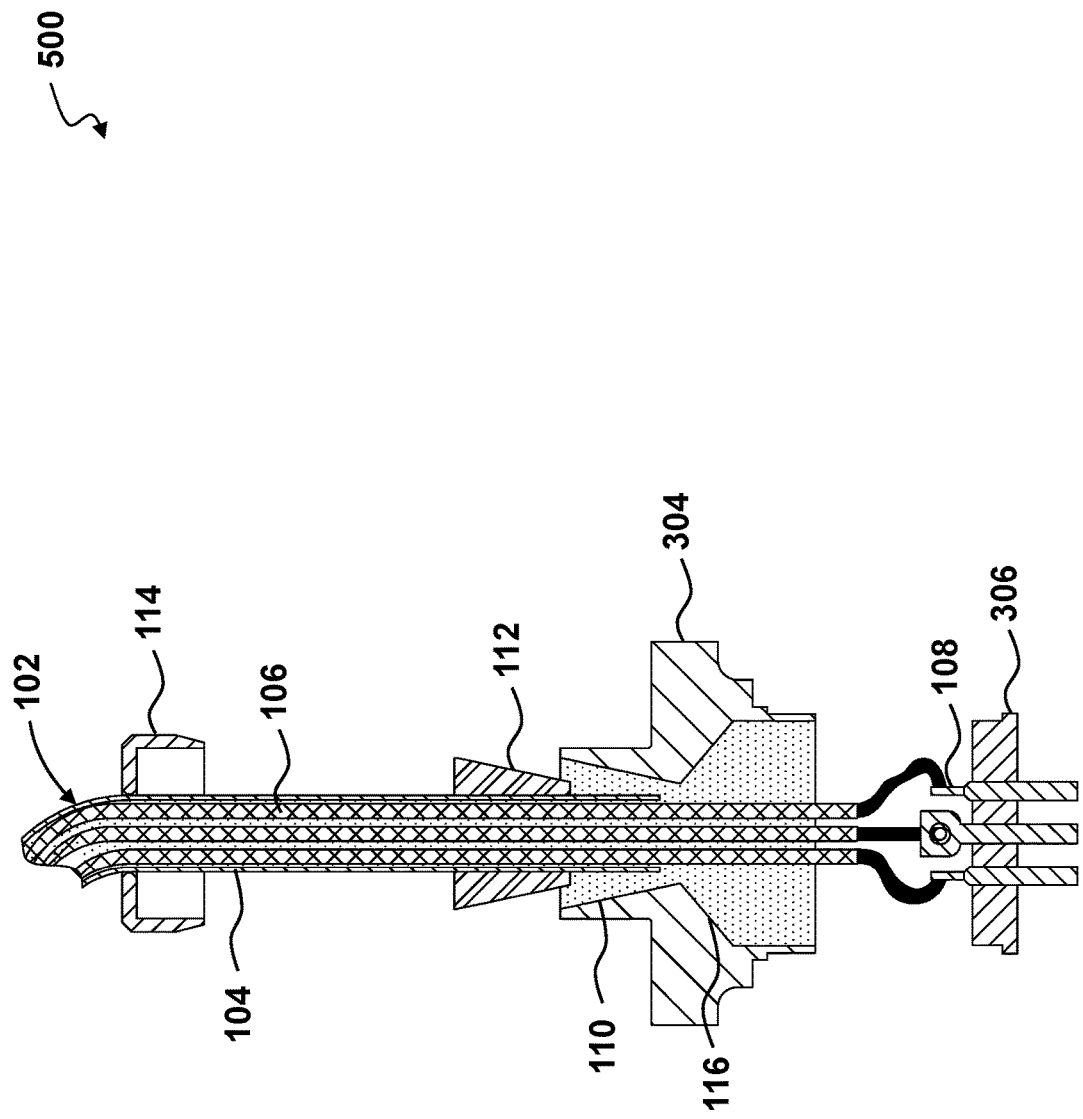
FIG. 5 depicts a cross-section exploded view of the system of FIG. 4 about line A-A.

FIG. 5 depicts a cross-section exploded view of the system 300 of FIG. 4 about line A-A. The compression cap 114 and the tapered seal 112 may both be placed about the external cable insulation 104 of the cable 102. The terminals 108 are attached to a lower housing 306, which is connected to the upper housing 304. In some embodiments, the housing may be a single piece. The tapered exit hole 110 is connected to the internal volume 116 such that encapsulant may be filled into the internal volume 116 via the tapered exit hole 110. The encapsulant may be forced from the internal volume and into the tapered exit hole 110 upon insertion of the tapered seal 112.

Figure 6:
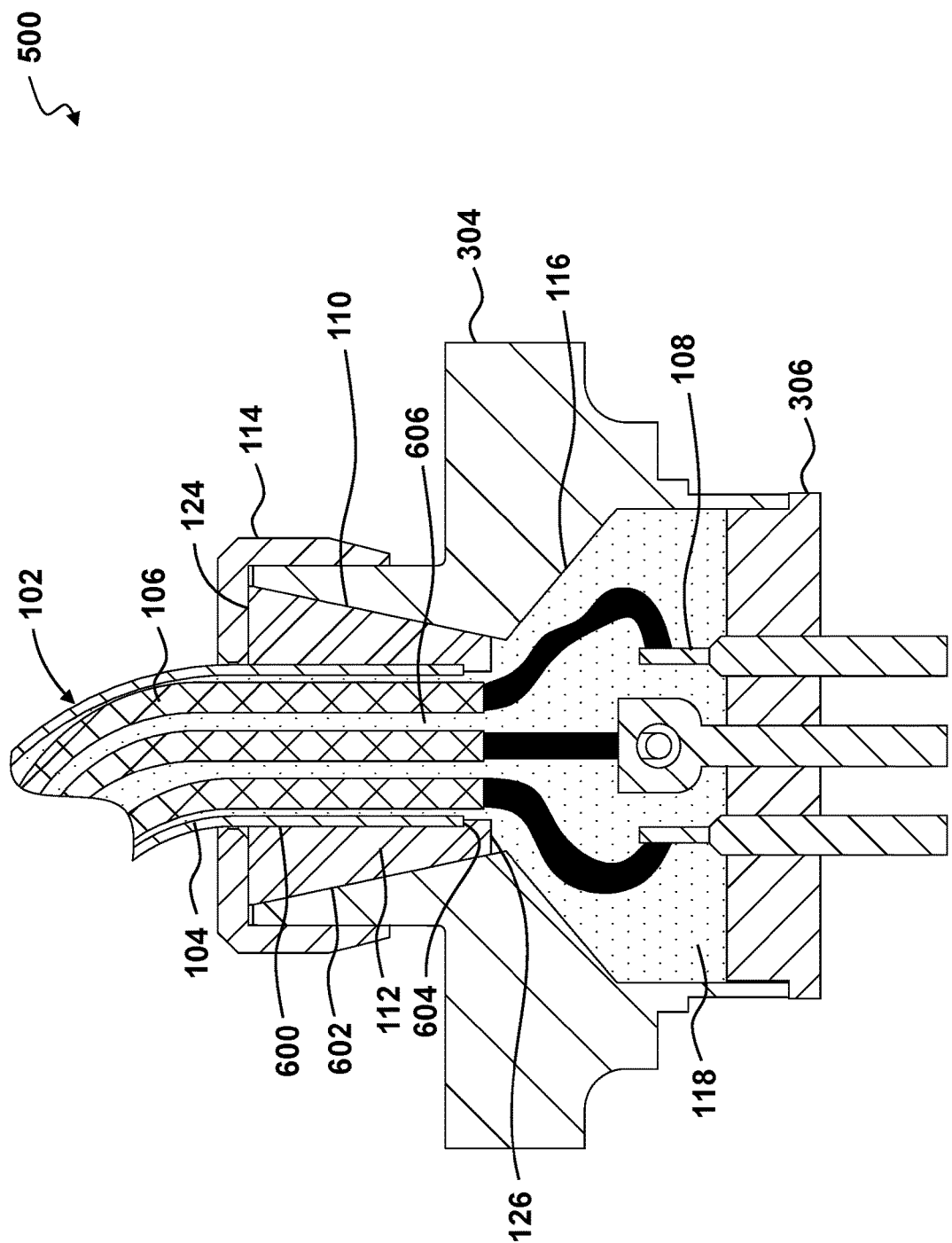
FIG. 6 depicts a cross-section assembled view of the system of FIG. 4 about line A-A.

FIG. 6 depicts a cross-section assembled view of the system 300 of FIG. 4 about line A-A. The compression cap 114 is placed over the tapered seal 112 and about the flange of the upper housing 302 to compress the tapered seal 112 into the tapered exit hole 110. A first seal 602 may be formed between the tapered outer surface of the tapered seal 112 and the tapered exit hole 110. A second seal 600 may be formed between the inner aperture of the tapered seal 112 and the external cable insulation 104 of the cable 102.

Compression from the compression cap 114 forces the low viscosity encapsulant 118 up inside the cable 102 and around 606 the one or more wires of the cable forming a third seal 606. Curing of the low viscosity encapsulant 118 seals the cable 102 to the upper housing 302. The encapsulant 118 is still liquid when filling the housing. The encapsulant may be a silicone elastomer in some embodiments. When the tapered seal 112 is compressed into the tapered hole 110 of the housing 120, it displaces a portion of the encapsulant up into the cable 102. After curing, this encapsulant 118 material seals the internal leak paths of the cable 102.

In some embodiments, the inner aperture of the tapered seal 112 may include at least one stop 604 to prevent the external cable insulation 104 from exiting the second side of the tapered seal. In some embodiments, the at least one stop 604 may be an area of the inner aperture of the tapered seal 112 having a smaller diameter than the rest of the inner aperture of the tapered seal 112. In other embodiments, the at least one stop 604 may be one or more protrusions extending from the inner aperture of the tapered seal 112. In other embodiments, the at least one stop 604 may be separate from the tapered seal 112. A portion of the external cable insulation 104 may be stripped prior to inserting the cable 102 into the tapered seal 112 providing enough wire length such that the wires can be attached to their respective terminals 108 on the lower housing 304 prior to connecting the lower housing 304 to the upper housing 302 and filling the internal volume 116 with encapsulant 118.

Figure 7:
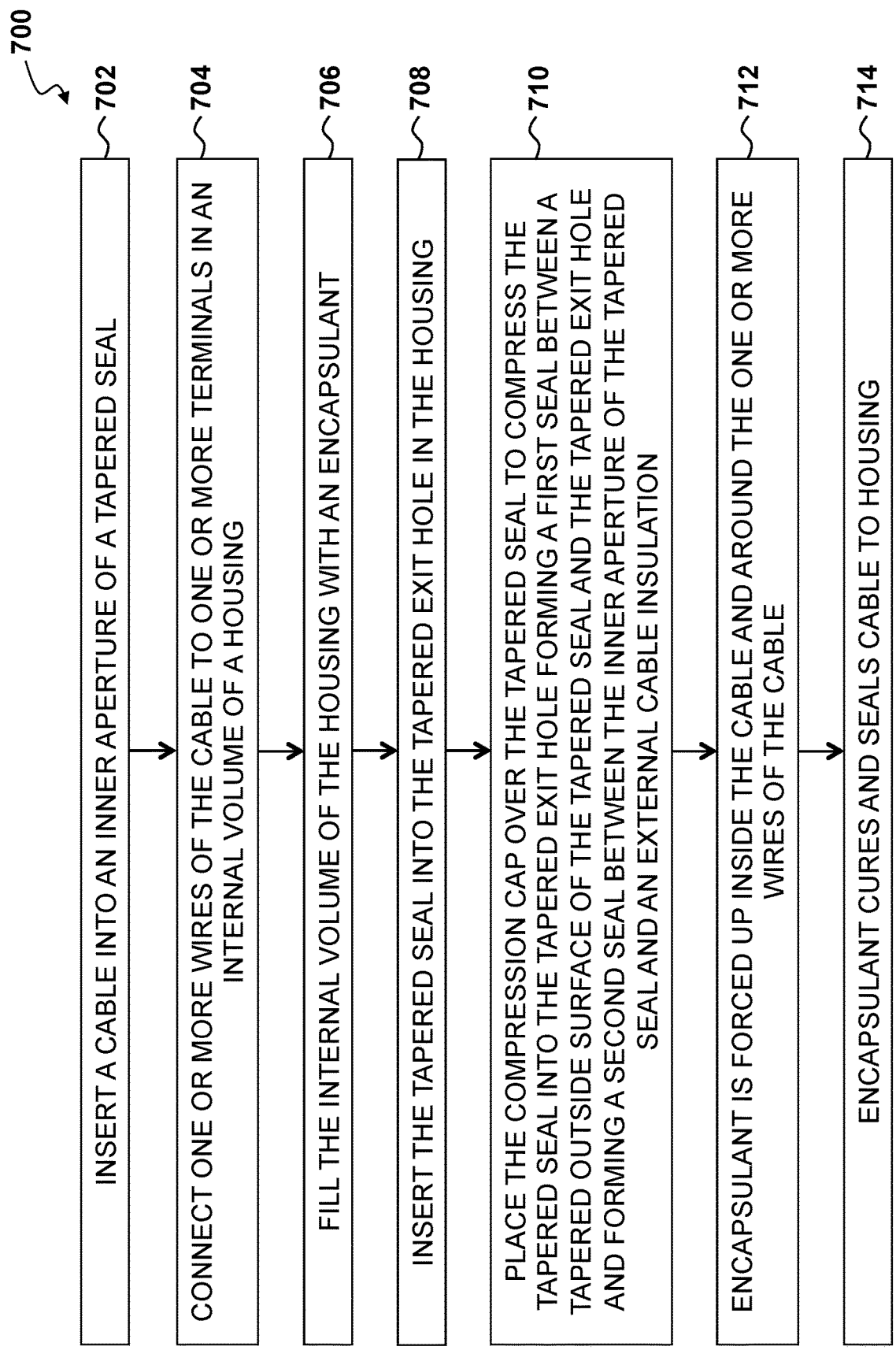
FIG. 7 depicts a block diagram of a method of sealing a cable at an entry point.

FIG. 7 depicts a block diagram of a method 700 of sealing a cable at an entry point. The method 700 may include inserting a cable into an inner aperture of a tapered seal (step 702). The cable may include an external cable insulation and one or more wires disposed in the external cable insulation. The tapered seal may include a tapered outer surface. The method 700 may then include connecting one or more wires of the cable to one or more terminals of a housing (step 704). In some embodiments, the housing may include a lower housing attached to an upper housing. The upper housing may include a tapered exit hole connected to an internal volume. The one or more terminals may be disposed in the internal volume.

The method may then include filling an internal volume of the housing with an encapsulant (step 706). The encapsulant may be a low viscosity encapsulant. The encapsulant may surround the one or more wires of the cable connected to the one or more terminals. The method may then include inserting the tapered seal into the tapered exit hole in the housing (step 708).

The method may then include placing the compression cap over the tapered seal to compress the tapered seal into the tapered exit hole forming a first seal between an outside diameter of the tapered seal and the tapered exit hole and forming a second seal between the inner aperture and the external cable insulation of the cable (step 710).

The method may then include forcing the encapsulant up inside the cable and around the one or more wires of the cable via compression from the compression cap (step 712). The encapsulant surrounding the cables may form a third seal. The method may then include curing the encapsulant as once the encapsulant cures the cable is sealed to the housing (step 714).

The disclosed system and method actively seals the cable outer diameter, which will maintain a seal even during thermal expansion and contraction. The internal passages of the cable are sealed by displacing encapsulant material, forcing it up into the cable, and then curing in place. Cable strain relief is provided as a result of the rubber-like seal expanding within the housing and preventing it from being pulled back through the hole in the housing.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system comprising:
    a cable comprising an insulation and one or more wires disposed in the insulation;
    a housing comprising a tapered exit hole connected to an internal volume, wherein the one or more wires of the cable are connected to one or more terminals disposed in the internal volume;
    a tapered seal comprising a tapered outer surface and an inner aperture, wherein the inner aperture of the tapered seal receives the cable;
    a low viscosity encapsulant disposed in the internal volume and about the one or more wires of the cable connected to the one or more terminals, wherein the low viscosity encapsulant comprises an elastic material; and
    a compression cap placed over the tapered seal to compress the tapered seal into the tapered exit hole;
    wherein compression from the compression cap forces the encapsulant up inside the insulation of the cable and around wire strands of the one or more wires of the cable, wherein the encapsulant prevents capillary transport of moisture through the one or more wires of the cable, and wherein curing of the encapsulant seals the cable from moisture ingress.

2. The system of claim 1, wherein the encapsulant is forced up inside the insulation of the cable by a pumping action from compression of the tapered seal into the tapered exit hole.

3. The system of claim 1, wherein a strain relief of the cable is provided as a result of the tapered seal expanding within the housing and preventing the tapered seal from being pulled back through the tapered exit hole in the housing.

4. The system of claim 1, wherein the compression cap comprises an aperture, and wherein the aperture of the compression cap receives the cable.

5. The system of claim 1, wherein the compression cap is placed over the tapered seal to compress the tapered seal into the tapered exit hole forming a first seal between the tapered outer surface of the tapered seal and the tapered exit hole and forming a second seal between the inner aperture of the tapered seal and the external cable insulation of the cable, and wherein the encapsulant forced up inside the cable and around the one or more wires of the cable extrudes past the tapered exit hole to provide a secure mechanical resisting force to pulling on the cable.

6. The system of claim 1, wherein the low viscosity encapsulant comprises a silicone elastomer.

7. The system of claim 6, wherein the tapered exit hole is at least partially disposed in a flange of the upper housing.

8. The system of claim 6, wherein the housing further comprises a lower housing, wherein the lower housing comprises the one or more terminals.

9. The system of claim 1, wherein the cable insulation is an external cable insulation, and wherein the housing comprises an upper housing, wherein the upper housing comprises the tapered exit hole and the internal volume, and wherein a diameter of a first side of the tapered exit hole is greater than a diameter of a second side of the tapered exit hole.

10. The system of claim 9, wherein the tapered exit hole is connected to the internal volume proximate the second side of the tapered exit hole.

11. The system of claim 9, wherein a diameter of a first side of the tapered seal is greater than a diameter of a second side of the tapered seal, and wherein the tapered seal is disposed in the tapered exit hole such that the first side of the tapered seal is proximate the first side of the tapered exit hole and the second side of the tapered seal is proximate the second side of the tapered exit hole.

12. The system of claim 11, wherein the inner aperture of the tapered seal includes at least one stop to prevent the cable insulation from exiting the second side of the tapered seal.

13. A method comprising:
 inserting a cable into an inner aperture of a tapered seal comprising a tapered outer surface;
 connecting one or more wires of the cable to one or more terminals of a housing;
 filling an internal volume of the housing with a a-low viscosity encapsulant, wherein the encapsulant surrounds the one or more wires of the cable connected to the one or more terminals, and wherein the low viscosity encapsulant comprises an elastic material;
 inserting the tapered seal into a tapered exit hole in the housing, wherein the tapered exit hole is connected to the internal volume; and
 placing a compression cap over the tapered seal to compress the tapered seal into the tapered exit hole;
 wherein compression from the compression cap forces the encapsulant up inside the insulation of the cable and around wire strands of the one or more wires of the cable, wherein the encapsulant prevents capillary transport of moisture through the one or more wires of the cable, and wherein curing of the encapsulant seals the cable from moisture incursion.

14. The method of claim 13, further comprising:
 forcing the encapsulant up inside the insulation of the cable by a pumping action from compression of the tapered seal into the tapered exit hole.

15. The method of claim 13, wherein a strain relief of the cable is provided as a result of the tapered seal expanding within the housing and preventing the tapered seal from being pulled back through the tapered exit hole in the housing.

16. The method of claim 13, further comprising:
 preventing the cable from exiting the tapered seal via at least one stop.

17. The method of claim 13 wherein the low viscosity encapsulant comprises a silicone elastomer.

18. The method of claim 17, further comprising:
 placing the cable comprising an external cable insulation through an aperture of the compression cap, wherein the one or more wires are disposed in the external cable insulation, wherein the housing further comprises an upper housing and a lower housing;
 attaching the lower housing to the upper housing, wherein the upper housing comprises the tapered exit hole connected to the internal volume, and wherein the one or more terminals are disposed in the internal volume.

19. The method of claim 13, wherein placing the compression cap over the tapered seal further comprises:
 forming a first seal between an outside diameter of the tapered seal and the tapered exit hole.

20. The method of claim 19, wherein placing the compression cap over the tapered seal further comprises:
 forming a second seal between the inner aperture of the tapered seal and the external cable insulation of the cable.

* * * * *